Aug. 19, 1930.  A. P. RISSLER ET AL  1,773,376
BRAKE BEAM SUPPORT ARM BRACKET
Filed Jan. 10, 1929  2 Sheets-Sheet 1
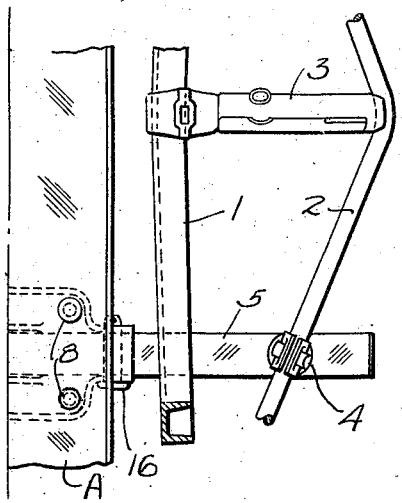
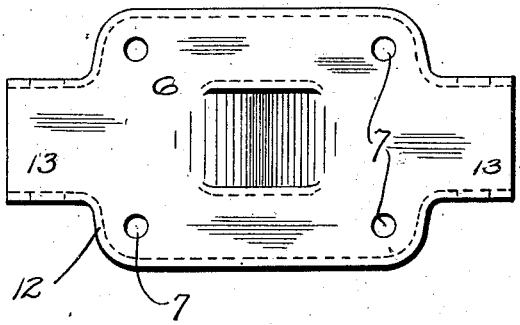
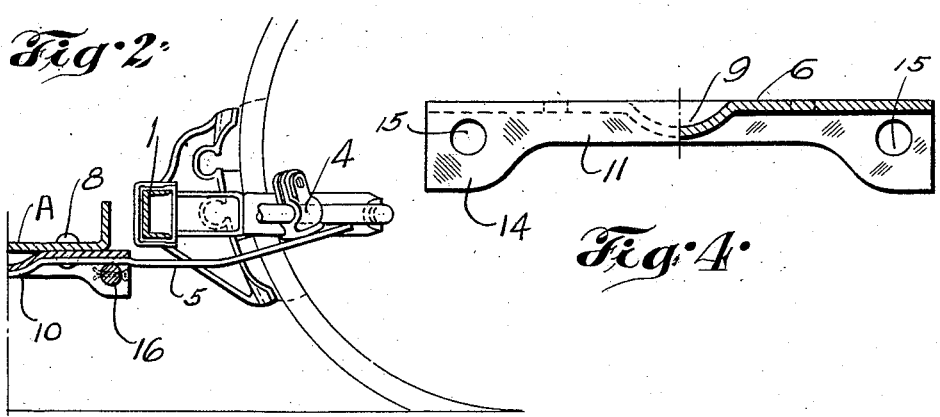
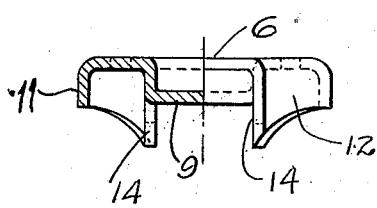
INVENTORS
Albin P. Rissler
Edwin G. Busse
By Rodney Bedell
ATTORNEY Aug. 19, 1930.                A. P. RISSLER ET AL                1,773,376
                        BRAKE BEAM SUPPORT ARM BRACKET
                    Filed Jan. 10, 1929        2 Sheets-Sheet 2

INVENTOR
Albin P. Rissler
Edwin G. Busse
BY Rodney Bedell
    ATTORNEY

Patented Aug. 19, 1930

1,773,376

UNITED STATES PATENT OFFICE

ALBIN P. RISSLER AND EDWIN G. BUSSE, OF CHICAGO, ILLINOIS, ASSIGNORS TO CHICAGO RAILWAY EQUIPMENT COMPANY, OF CHICAGO, ILLINOIS, A CORPORATION OF ILLINOIS

BRAKE-BEAM SUPPORT-ARM BRACKET

Application filed January 10, 1929. Serial No. 331,439.

Our invention relates to railway rolling stock and consists in a novel bracket for mounting a third or fourth point support or guide arm for railway truck brake beams.

It is the main object of our invention to forge a bracket having a body portion for application to the truck spring plank and having other portions for guiding a support arm and affording seats for a support arm carrying element. Up to the present time, the most satisfactory form of bracket has consisted of a casting, although the advantages of forging have been recognized. There have been previous efforts made to forge a bracket. These efforts have involved the doubling of the bracket metal on itself which is difficult in machine forging operations and unduly stresses the metal and requires more metal than is necessary and unduly increases the cost of the bracket over a forged bracket. Other efforts have required that the rivets securing the bracket to the spring plank be countersunk in the sheet metal of which the bracket is formed which is objectionable as the attachment of the bracket to the spring plank is not assured. In another form, the rivets have been so spaced from the guard that the rivet heads need not be countersunk but the bracket was not sufficiently rigid between the rivets, which secure the bracket to the spring plank, and the flanges which seat the guide carrying pins.

Our present bracket overcomes the objectionable features referred to and provides an economical and efficient forged bracket for the intended purpose.

In the accompanying drawings which illustrate our invention—

Figure 1 is a top view of a railroad truck spring plank, brake beam, support arm and bracket mounting the support arm on the spring plank.

Figure 2 is a vertical section through the structure shown in Figure 1.

Figure 3 is a top view of our improved bracket.

Figure 4 is in part a side view and in part a longitudinal section through the center of the bracket.

Figure 5 is in part an end view and in part a transverse section through the center of the bracket.

Figure 6:
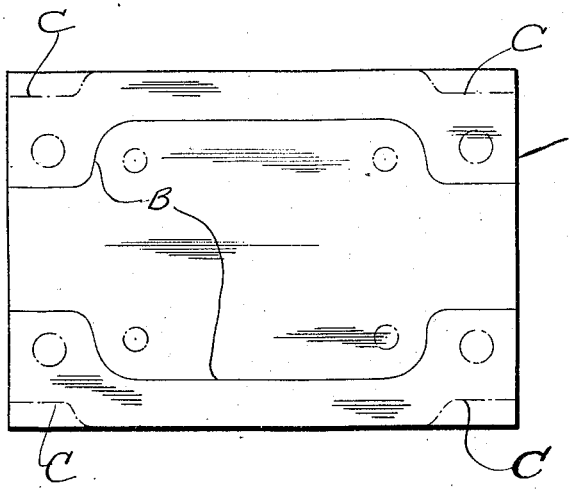
Figure 6 is a bending, punching and shearing diagram of the blank from which the bracket is formed.

The spring plank shown in Figures 1 and 2 is of the usual upturned channel form and the brake beam indicated is of the trussed type having a compression member 1, a tension member 2 and a strut 3. A chair 4 is mounted on the tension member 2 of the beam and rides on the support arm 5 which is mounted upon the spring plank A by means of our novel bracket.

The bracket is of inverted channel shape generally and comprises a relatively wide body portion 6 which fits against the flat underside of the spring plank A and is provided with widely spaced openings 7 for receiving the securing elements such as rivets 8. In the center of the bracket is a depressed portion 9 which serves to position the guide arm 5 in a well known manner, the guide arm having a corresponding depression 10 fitting with the depression in the bracket.

The sides of the bracket are flanged downwardly as indicated at 11 and the flanges intermediate their ends are offset transversely of the bracket as indicated at 12 to provide narrower end portions 13 for the bracket in which the flanges are closer to each other than at the intermediate portion of the bracket and also are deeper so as to provide seats 15 for the support arm carrying pins 16.

The flanges 11—14 extend continuously from the seats 15 to and around the holes 7 for the securing rivets and thus the bracket is rendered sufficiently rigid and strong between these points where devices of the type shown in Figure 5 of Busse Patent 1,182,455 would be most likely to fail.

Figure 6 plainly indicates the simplicity of forming the bracket as the plate P is rectangular and therefore does not involve any waste of material. The bracket may be punched and bent in a single operation, the bending lines being indicated at B. Where the clearance between the spring plank and the rail is limited, it may be desirable to remove surplus material from the end portions of the down-turned flanges and in this case the plate may be trimmed along the lines indicated at C.

Where the spring plank is high enough above the rail so that the depending flanges 14 do not project below the clearance limits, the extra material below flanges 16 is not objectionable, and need not be removed. This will save trimming and die cost.

Figure 7:
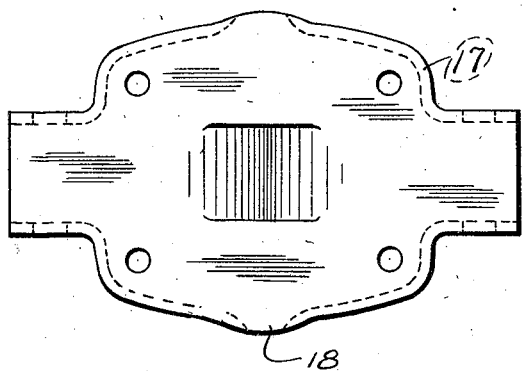
Figure 7 is a top view of a modified form of bracket.
Figure 8:
Figure 8 is a longitudinal vertical section through the same.
Figure 9:
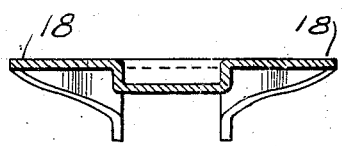
Figure 9 is a transverse vertical section through the same.

In the modification illustrated in Figure 7, the side flanges 17 do not extend continuous from end to end of the bracket but are of gradually decreasing depth towards the center of the bracket and fade out at the middle portion as indicated at 18. In this bracket, the ends of the flanges have been cut as shown at 19 to decrease the depth thereof.

The illustrated device may be manufactured more economically than a cast bracket of the same size and affords all the advantages of pressed steel without having any weakened structure at vital points as have been present in such previous attempts at providing forged brackets with which we are familiar.

We contemplate the exclusive use of such modifications in the details of our structure as come within the spirit of our invention as expressed in our claims.

We claim:

1. A brake beam support arm bracket forged from a plate and provided with downwardly bent flanges extending lengthwise of the bracket along the sides thereof, said flanges being offset laterally intermediate their ends to provide a restricted space between said flanges at one point, whereby the adjacent portions of said flanges may position a support arm, and to provide a relatively wider space between said flanges at another point for accommodating bracket securing elements spaced transversely of the bracket a greater distance than the width of said restricted space.

2. A brake beam support arm bracket forged from a plate and provided with downwardly bent flanges extending lengthwise of the bracket along the sides thereof, said flanges being offset laterally intermediate their ends to provide a restricted space between said flanges at one point, whereby the adjacent portions of said flanges may position a support arm, and to provide a relatively wider space between said flanges at another point for accommodating bracket securing elements spaced transversely of the bracket a greater distance than the width of said restricted space, said flanges adjacent to said restricted space being deeper than elsewhere and provided with bearings for a support arm carrying element.

3. A brake beam support arm bracket comprising a metal plate forged to form a wide flat spring plank engaging portion having transversely spaced openings, adapted to receive securing elements, there being a depression in said portion between said openings for positioning a support arm lengthwise of the bracket, and relatively narrow end portions having depending flanges for positioning a support arm intermediate said openings and suspending a carrying element for such an arm, said flanges extending unbroken from said end portion past said openings to the intermediate portion of the bracket.

4. A brake beam support arm bracket comprising a forging having a body portion for application to a car part, depending flanges at the ends of said body portion forming seats for a support arm carrying element, said body portion extending transversely of the bracket beyond said seats for receiving attaching elements, said flanges extending lengthwise of the bracket between said seats and the sides of said body portion so as to provide adequate rigidity and strength between the supported and supporting points of the bracket.

5. A brake beam support arm bracket comprising a wide body portion for attachment to a car part, flanges along the sides of the bracket, continuous from end to end of the bracket, having their outer ends offset inwardly of the bracket and forming a lateral guide at each end of the bracket substantially narrower than said attaching portion.

6. A brake beam support arm bracket formed from a flat rectangular plate, parallel side portions of which plate are bent downwardly to provide reinforcing flanges, the end portions of said bracket being narrower than the intermediate portions and the end portions of said flanges being deeper than the intermediate portions whereby said end portions provide restricted guides for a support arm and provide seats for arm carrying pins and whereby the intermediate portion of the bracket is adapted to receive attaching elements spaced from each other on opposite sides of the longitudinal center line of the bracket so as to permit the passage of a support arm between them.

7. In combination, a railway truck spring plank, a bracket applied to the underside thereof and comprising an inverted channel with its flanges offset laterally of the bracket, a support arm fitting between said flanges where they are nearest each other, and securing elements extending through said spring plank and bracket at the side of said support arm where said flanges are farthest apart.

8. In combination, a railway truck spring plank, a bracket applied to the underside thereof and comprising an inverted channel with its flanges offset laterally of the bracket, a support arm fitting between said flanges where they are nearest each other, and a plurality of securing devices extending through said spring plank and bracket between each side of said support arm and the adjacent flange.

In testimony whereof we hereunto affix our signatures this seventh day of January, 1929.

ALBIN P. RISSLER.
EDWIN G. BUSSE.